Patented Nov. 21, 1944

2,363,286

UNITED STATES PATENT OFFICE 2,363,286

VINYL ESTERS OF UNSATURATED ACIDS

Walter Bauer and Carl T. Kautter, Darmstadt, Germany, assignors to Röhm & Haas Company, Philadelphia, Pa.

No Drawing. Application May 13, 1939, Serial No. 273,587. In Germany May 18, 1938

5 Claims. (Cl. 260—486)

This invention relates to a process for producing vinyl esters of acrylic acid and its homologs.

It is known that vinyl esters of saturated acids, such as acetic, propionic, etc., can be prepared by passing acetylene into the acid in which a mercury salt is suspended. Heretofore only the vinyl esters of saturated acids have been prepared. The acrylic and methacrylic acid esters of the saturated alcohols have also been known for some time as have also the esters obtained from these acids and higher unsaturated alcohols. Many of these higher esters, both from saturated and unsaturated alcohols, have been prepared by alcoholysis of the lower aliphatic esters such, for example, as methyl acrylate and methyl methacrylate. All of these esters, whether derived from the saturated or from the unsaturated alcohols, can be polymerized to resinous materials varying in consistency from hard, glass-like polymers to soft, gummy ones. In no case, however, has an ester been prepared in which there are two groups susceptible to direct polymerization, one in the acid radical and the other in the alcohol radical. The vinyl esters of acrylic and methacrylic acids are compounds of this type but they cannot be prepared by alcoholysis from other esters for the reason that monomeric vinyl alcohol does not exist.

It has now been found that the vinyl esters of acrylic and methacrylic acid can be prepared in good yields from acetylene and the free acid, provided precautions are taken to prevent premature polymerization. This is accomplished by dissolving mercuric oxide in the acid and passing a vigorous stream of acetylene through the solution. It is also advantageous to add some sulfur trioxide, as such, or in the form of fuming sulfuric acid, to the solution as this increases the catalytic activity of the mercuric salt. In order to prevent premature polymerization, a small amount of polymerization inhibitor, such as hydroquinone or some other high-boiling phenol, is added to the reaction mixture.

The invention may be illustrated by the following examples:

Example 1

A few percent by weight of mercuric oxide and a little hydroquinone are dissolved in acrylic acid. This solution is then heated to 90–95° C. and a vigorous stream of acetylene led in. The acetylene which passes through the solution carries the vinyl acrylate with it. The ester is condensed, washed with water and soda solution, and dried over calcium chloride. The crude product is purified by fractional distillation at atmospheric pressure, the main fraction passing over between 92.5 and 95° C. The saponification number of this product shows it to be 95.4% pure vinyl acrylate. Further purification by fractional distillation yields a product boiling at 94° C. under atmospheric pressure.

Example 2

A solution of mercuric oxide and sulfur trioxide in methacrylic acid is treated with acetylene at 50–90° C. The acetylene may be bubbled through the solution or thoroughly mixed with it in a shaking bomb. On purifying the product by fractional distillation, vinyl methacrylate is obtained as a colorless, clear liquid boiling at 112° C./760 mm. Its specific gravity is 0.932 and the refractive index $n_D^{20}$ 1.4359. The saponification number corresponds to that calculated for pure vinyl methacrylate.

The vinyl esters of acrylic and methacrylic acid can be polymerized in the usual manner by exposure to light, heat, and the influence of catalysts. The polymers thus formed are infusible and insoluble in the ordinary organic solvents. Vinyl methacrylate polymer is unusually hard and of high tensile strength, being superior to methyl methacrylate in both of these properties. Joint polymers of vinyl acrylate or vinyl methacrylate with other acrylates or methacrylates are stronger and less susceptible to attack by solvents than the corresponding polymeric esters of saturated alcohols.

We claim:

1. The process of preparing vinyl acrylate which comprises reacting on acrylic acid with acetylene in the presence of a mercuric salt and hydroquinone at temperatures of from 50 to 95° C.

2. The process of preparing esters of acrylic acid which comprises treating the acid with acetylene in the presence of a mercuric salt.

3. The process of preparing vinyl acrylate which comprises treating acrylic acid with acetylene in the presence of a mercuric salt.

4. The process of preparing vinyl acrylate which comprises treating acrylic acid with acetylene in the presence of a mercuric salt and a polymerization inhibitor.

5. The process of preparing esters of acrylic acid which comprises treating the acid with acetylene in the presence of a mercuric salt and a polymerization inhibitor.

WALTER BAUER.
CARL T. KAUTTER.